(12) United States Patent
Dardelet et al.

(10) Patent No.: US 6,575,636 B2
(45) Date of Patent: Jun. 10, 2003

(54) COMPOSITE BEARING WITH DOUBLE BALL BEARINGS, PROCESS FOR ITS ASSEMBLY AND TOOL FOR THE REALIZATION OF A PAIR OF COLLARS OF SAID BEARING

(75) Inventors: Hervé Dardelet, Eragny sur Oise (FR); Michel Augot, Domerat (FR); Marc Jenger, Domerat (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/803,363

(22) Filed: Mar. 12, 2001

(65) Prior Publication Data

US 2001/0026653 A1 Oct. 4, 2001

(30) Foreign Application Priority Data

Mar. 21, 2000 (FR) .............................. 00 03582

(51) Int. Cl.[7] .............................. F16C 33/60
(52) U.S. Cl. .................. 384/504; 29/898.062; 384/510
(58) Field of Search ................. 384/504, 533, 384/510; 219/125.11, 121 EM, 121 LM, 121 P, 121 L, 7.5, 59.1, 61.1, 10.43, 10.57, 10.55 M, 61.2; 308/177; 29/724, 725, 898.062

(56) References Cited

U.S. PATENT DOCUMENTS

| | | | | |
|---|---|---|---|---|
| 1,441,842 A | * | 1/1923 | Fox ...................... 29/898.062 |
| 3,586,396 A | * | 6/1971 | Barr et al. .................... 384/49 |
| 3,980,354 A | | 9/1976 | Lamprecht |
| 4,232,914 A | * | 11/1980 | Bowen, III .................. 384/567 |
| 4,330,911 A | * | 5/1982 | Kapaan et al. ......... 29/898.063 |
| 4,419,816 A | | 12/1983 | Kapaan et al. |
| 4,858,294 A | * | 8/1989 | Hollox ........................ 148/210 |
| 4,943,171 A | * | 7/1990 | Hofmann et al. ........... 384/537 |
| 5,061,090 A | | 10/1991 | Kriaski et al. |
| 5,667,313 A | * | 9/1997 | Kapaan et al. .............. 384/504 |
| 6,010,247 A | * | 1/2000 | Mouri et al. ................ 384/501 |
| 6,390,681 B1 | * | 5/2002 | Nakazeki et al. ........... 384/107 |

FOREIGN PATENT DOCUMENTS

DE 166796 1/1906
WO WO 99/31397 6/1999

* cited by examiner

*Primary Examiner*—Jack Lavinder
*Assistant Examiner*—Benjamin A Pezzlo
(74) *Attorney, Agent, or Firm*—Larson & Taylor PLC (57) ABSTRACT

Composite bearing with double ball bearings (4) for the rotary support of a rotating shaft (1) of a very high precision device, wherein this bearing with double ball bearings is constituted by the juxtaposition of two bearings with single ball bearings having two respective corresponding races ($5_1$, $5_2$), interior or exterior, tightened axially against one another with a predetermined pre-stress, characterized in that the two races ($5_1$, $5_2$) maintained tightened against one another with said pre-determined pre-stress are welded (9) to each other by their co-operating faces.

5 Claims, 4 Drawing Sheets

COMPOSITE BEARING WITH DOUBLE BALL BEARINGS, PROCESS FOR ITS ASSEMBLY AND TOOL FOR THE REALIZATION OF A PAIR OF COLLARS OF SAID BEARING

FIELD OF THE INVENTION

The present invention relates to improvements made in the field of composite bearings with double ball bearings for the rotary support of a rotating shaft of a very high precision device, wherein these bearings with double ball bearings are constituted by the juxtaposition of two bearings with single ball bearings having two respective corresponding races, interior or exterior, fitting tightly axially one against the other with predetermined pre-stress.

DESCRIPTION OF THE PRIOR ART

In some very high precision devices (for example, in inertial navigation centers), it is necessary and indispensable that a rotating shaft is mounted and supported in a bore with very great precision of coaxiality without any play, in order to obtain high performances. Such a requirement necessitates that the balls of the ball bearings remain permanently in the contact of their path in order to avoid the consequences inherent in "take-offs" of the balls (generation of shocks, wear and tear, appearance of plays), which are eventually reflected by a loss of precision of the device. In order to clarify ideas, it will be noted that in the case of the appearance of a vibratory operating regime, it is an effort which can for example reach 900 N which can be exerted on a ball bearing race having a diameter of the order of 35 mm and a thickness of around 3 mm.

In order to be able to meet practical requirements, one thus resorts to bearings equipped not with single ball bearings, but with double ball bearings.

The easiest solution, which would consist in using a single bearing equipped with double juxtaposed ball bearings, however, cannot be used. This is because, even if very high precision machinery were used, the double ball bearings have dimensional differences (distance between axes, diameters of the balls, diameter of the receptacles, etc.), which are too great for the rotating shaft to be able to be supported in the bore with all the required precision and absence of play.

Thus it is known that one can resort to two bearings with single ball bearings, which are paired and which are then implemented under axial pre-stress of their respective corresponding races, either interior or exterior, in such a way that they thus behave like a single bearing with double ball bearings. In this case, as opposed to the single bearing with double ball bearings, each bearing can be manufactured with all the desired precision. The respective co-operating faces of the two races, interior or exterior, of the two bearings can be rectified in order to be in perfect contact one against the other. Also, the rigidity conferred by the pre-stressing finally leads to a bearing (hereinafter referred to as "composite bearing" because it is constituted by the reunion of two bearings with mono-ball bearings), which can satisfy practical requirements with regard to precision and the absence of play of the assembly of the rotating shaft in the support bore.

Even if the results obtained with this type of composite bearing satisfy practical requirements, on the other hand the assembly processes of such a composite bearing are complex and present many problems.

A usual assembly process takes place as follows. After pairing of the composing pieces (and in particular of the two races to be placed side by side under pre-stress), the two bearings are dismounted, then a first race is implemented in support against an axial capacity; for example in the case of an interior race, it is mounted on the shaft just to the point of abutment against a radial, annular retaining wall provided on the shaft.

The second race is then pre-positioned in immediate proximity to the first race, but without being in contact with it; in the example considered of interior races, the second race is mounted in turn on the shaft in immediate proximity of the first race.

One thus brings an axial pressure tool against the second race and, with the assistance of this tool, one displaces the second race axially towards the first race just to the point of physical contact with it, then one continues to exert a force on the second race until the support pre-stress of the second race on the first reaches a pre-determined value. Still within the scope of the considered example of interior races, the tightening tool can consist in a nut which is screwed on the end of the shaft, which is threaded to this effect. This nut, which is moreover appropriately suited to be in perfect axial support against the second race, is suitable, in the course of its rotation, for displacing the second race to first of all take it against the first race, then for putting the two races under axial pre-stress at a pre-determined value.

The drawbacks of this existing process consist in that it is necessary on the one hand to specifically adjust (threading for the tightening nut) the support element of the races under pre-stress (the support bore for exterior races, the shaft for interior races) and on the other hand it is necessary to maintain in permanence the elements necessary for the assembly (threading and nut), since the pre-stress of the races is only due to the presence of the tightening tool (nut screwed on the threading for example). This results in an increase in weight of the unit and, in the case of interior races, an inertial modification of the mobile gear. These constraints may not be accepted, in particular when it is a matter of reducing as far as possible the dimensions of the device thus equipped and reducing the weight thereof, as well as when it is a matter of increasing the response rapidity performances by reducing in a maximum way the inertias of the mobile parts.

In order to attempt to overcome said drawbacks, one has proposed the combining of the second race, in support under pre-determined pre-stress against the first race, by adhering (by a resin film) the second race on its support. In this case, it is admittedly still necessary to resort to a tightening tool to place the second race and the first side by side and to exert the prestress until the adhering of the second race on its support is mechanically effective. However, the tightening tool can then be withdrawn, and it is no longer present in the completed device which is ready to function.

However, this process itself also has drawbacks. Firstly, even if the tightening tool is admittedly not maintained in the device, certain adjustments necessary to its use remain in place: thus, in the case of a nut suitable for pushing the second race, the threading realized either in the bore (for exterior races) or on the end of the shaft (for interior races) remains on the bore or on the shaft. Practice may not accept the presence of this adjustment, which is not necessary to the functioning of the device.

In particular, the adhering film for combining the second race, which is relatively thin (for example typically 1.5 $\mu$m), is not very resistant to thermal shocks (for example typically variation of 3 to 4° C. per second in an ambiance of around 70° C.). The adhering film fractures and the races are no longer maintained under pre-stress (even becoming unstuck from their support), in such a way that the shaft is no longer supported with the required precision and the device loses its precision, or is even no longer in a state of being able to function.

In order to attempt to overcome these drawbacks, it has been proposed to increase the thickness of the layer of glue, which thus becomes able to withstand severe thermal conditions without deterioration. However, due to the very reason of the thickness of the layer of glue, the rigorous coaxiality of the races and of the support can no longer be assured when the races are put in place on the support. It is thus necessary to conserve axial positioning zones (without glue), which are suitable for assuring the mutual axial maintenance of the races and of the support and of the axial zones of different diameter (with glue), which are suitable for making the races solid with the support.

Such an assembly process necessitates manufacturing processes and proves to be too complicated.

Besides, it is to be noted that all the processes which have just been explained have the additional drawback that the pre-stressing of the two races takes place during the very course of the assembly of the second race on the support (bore or shaft), which particularly complicates the operational mode of pre-stressing.

From this viewpoint, it is thus desirable for the two races to be able to be reunited under axial pre-stress before their assembly, then to be mounted on the support in the form of a unitary block, which can thus be put into place in the same way as a traditional bearing with double ball bearings.

With this aim in view, one could admittedly envisage making the two races solid with the assistance of crimping tongs. However, this process does not prove to be very practical, and furthermore the assembled races would remain equipped with the crimping tongs, which maintain the pre-stress. This is again one of the drawbacks of the first process explained above.

SUMMARY OF THE INVENTION

It is thus an object of the invention to overcome as far as possible the drawbacks presented by the different solutions as in the state of technology and to propose an improved original solution which allows pre-assembly of the races under pre-stress, which dismisses any adaptation of the support specifically for the mounting of the races, which does not allow to remain in the completed device any additional part specific to the mounting and/or to the maintenance of the pre-stress of the races, and which allows production in relatively large series of races which are pre-assembled under pre-stress For this purpose, according to a first embodiment, the invention proposes a composite bearing with double ball bearings such as that mentioned in the introductory clause which according to the invention is characterized in that the two races maintained fitting tightly one against the other with said pre-determined pre-stress are welded to one another by their co-operating faces.

According to a preferred embodiment, at least one of the edges, exterior or interior, of the co-operating faces of the races is beveled, and these beveled edges together form an annular groove. The welded joint is situated at the bottom of the groove and the welded joint does not project outside the groove.

Advantageously, it is the exterior edges of the co-operating faces of the races that are beveled in order to define an exterior groove and the races are made solid by a welded joint extending along the exterior edges of the faces joined end to end of the two races. However, it is also possible for the interior edges of the co-operating faces of the races to be beveled in order to define an interior groove and for the races to also be made solid by a welded joint extending along the interior edges of the faces joined end to end. Preferably, the two races are welded on the interior and on the exterior.

The welded joint can be formed from successive, continuous or discontinuous sections, on the perimeter of the groove, wherein the welded joint can in practice advantageously be a laser welded joint.

According to a second embodiment, the invention proposes a process for assembling a bearing with double ball bearings for the rotary support of a rotating shaft of a very high precision device, wherein this bearing with double ball bearings is constituted by the juxtaposition of two bearings with single ball bearings having two of their respective races, interior or exterior, axially fitting tightly together, wherein this process according to the invention is characterized in that it consists of the series of the following stages:

one pairs two bearings with single ball bearings, wherein their respective races, interior or exterior, have co-operating faces with complementary geometric properties, after disassembly of the two bearings, one positions said two respective races against one another, and one tightens them axially against one another with a pre-determined pre-stress, welding is carried out along at least one of the edges, exterior or interior, of the co-operating faces of the two respective races maintained under pre-stress, in such a way that the welded joint does not project radially beyond the peripheral annular faces of said races, then one re-assembles the one-piece component formed from the two welded under pre-stress races in position on its support part and one finishes the complete assembly of the bearing by eccentration according to the principle of deep-groove ball bearings.

In a simple way, one welds the two races along the exterior edges of their co-operating faces. However, in order to homogenize the efforts being exerted between the two races, it is likewise desirable to also weld the two races along the interior edges of their cooperating faces.

In practice, the welding is achieved with the assistance of a laser beam. In the case of welding on the interior edges of the races, the laser beam is guided onto the interior edges of the co-operating faces of the races successively through holes of a component for support and centering of the races positioned within them, and the welding is carried out in successive sections. By reason of the passage of the laser beam through said holes, the laser beam cannot be displaced in a continuous way, which means that the welding is realized by discontinuous, successive sections.

Preferably, the edges of the respective races are beveled and the welding is effected in the bottom of the groove formed by two co-operating beveled edges, in such a way that no welded joint element projects and the peripheral lateral face of the assembled races remains smooth. Nothing hampers their assembly on the support (bore or shaft).

Advantageously, the two races being welded along their interior and exterior co-operating edges, the welding of the interior co-operating edges is effected firstly and the welding of the exterior co-operating edges secondly.

According to a third embodiment, the invention proposes a tool of support, of coaxial centering and of pre-stressing of two races of ball bearings destined to be welded to one another, in order to implement said process.

According to a first method of realization, a tool designed to handle two interior races is proposed, wherein this tool, being constructed according to the invention, is characterized in that it comprises an essentially tubular chuck having a lateral wall with a cylindrical external face of revolution, which is suitable for supporting and centering coaxially, by their internal faces, two interior races positioned one after the other, first solid means of axial abutment of said chuck, against which a free face of one of the two races comes in support, and coaxial means of tightening to said chuck, comprising second means of axial abutment which are suitable for coming in support against the free face of the other of the two races in such a way that under the effect of said tightening means, the two races are tightened against one another until a pre-determined pre-stress value is obtained.

Advantageously in this case, the tool comprises a support plate of the chuck, wherein said plate is in the form of a bowl suitable for receiving coaxially a hub. The first means of abutment are provided on or constituted by the peripheral edge of the lateral wall of said hub. The second means of abutment are provided on a solid cover of said chuck, wherein said cover is open centrally to give access to the interior of the chuck.

In a second method of realization of the tool, a tool designed to handle two exterior races is proposed, wherein this tool, being constituted according to the invention, is characterized in that it comprises:

a hub of which the lateral wall presents a cylindrical internal face of revolution suitable for supporting and centering axially, by their external faces, two exterior races positioned one after the other, wherein the lateral wall of said hub is provided with a multiplicity of traversing holes distributed peripherally and in relation to which the external edges to be welded of the two races are situated, wherein each hole constitutes a passage so that a laser beam crossing it can weld said external edges of the two races, an approximately tubular chuck supported at the interior of the hub and having a lateral wall situated in relation to the wall of the hub, first solid means of axial abutment of said hub, against which a free face of one of the two races comes in support, and coaxial means of tightening to said hub, comprising second means of axial abutment suitable for coming in support against the free face of the other of the two races, in such a way that under the effect of said means of tightening, the two races are tightened against one another until a pre-determined pre-stress value is obtained.

Advantageously in this case, the second means of abutment are solid in respect of the chuck and are constituted by a flank projecting radially towards the exterior from the upper edge of the lateral wall of said chuck.

Advantageously, the tool has means of rotary support of the chuck.

Preferably, in one or the other of said tools, the lateral wall of the chuck is equipped with a multiplicity of traversing holes distributed peripherally and in relation to which the edges, respectively interior and exterior, of the co-operating faces of the two races to be welded are situated, wherein each hole constitutes a passage so that a laser beam crossing it can weld the edges of the races appearing at the opening of this passage. It is thus desirable for the holes of the chuck to be inclined towards the foot of the interior towards the exterior of the chuck wall in order to facilitate the positioning of the welding laser beam approximately in the axis of each hole.

BRIEF DESCRIPTION OF THE DRAWINGS

The invention will be better understood upon reading the following detailed description of certain preferred modes of realization given solely by way of example, being in no way limitative. In this description, reference is made to the attached drawings in which.

DETAILED DESCRIPTION OF THE INVENTION

Figure 1:
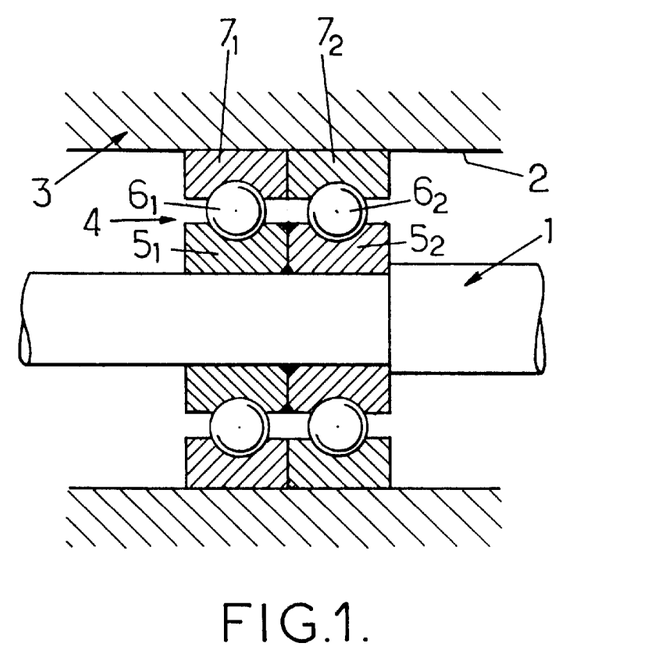
FIG. 1 is a partial schematic view in section of a unit constituted by a rotating shaft supported in a bore through the intermediary of a bearing with double ball bearings constructed according to the invention.

Referring first of all to FIG. 1, a rotating shaft 1, included in a very high precision device (for example a gyrometer of a navigation inertial center) is supported in rotation in a bore 2 of a support body 3 through the intermediary of a bearing 4 with double ball bearings.

The bearing 4 with double ball bearings is constituted by the juxtaposition of two bearings with single ball bearings. In the example shown, it is constituted by the juxtaposition of two interior races $5_1$ and $5_2$ (that is to say mounted on the shaft 1), which respectively retain two annular rows of balls $6_1$ and $6_2$ in relation respectively with two exterior races $7_1$ and $7_2$ (that is to say mounted in the bore 3). The details of the construction of the balls with separation casing and other parts known by specialists is not shown, in order to avoid complicating the drawing.

In order that the bearing 4 with double ball bearings with double race (hereinafter referred to as "composite bearing") has the same mechanical rigidity characteristics as a one-piece bearing with double ball bearings, two of the races, for example the two interior races $5_1$ and $5_2$, are maintained side by side under a pre-stress of a pre-determined value.

In order to avoid the drawbacks shown by the previous methods of assembly which were explained above, it is provided according to the invention that the two interior races $5_1$ and $5_2$ are welded to one another by their co-operating faces, wherein the welding is effected while the two races are maintained against one another under said pre-stress of the pre-determined value.

Considerable advantages are thus obtained from this type of assembly according to the invention. Thus, once they are welded, the two races are mechanically solid in respect of one another and form a one-piece component which is particularly rigid by reason of the pre-stress under which the, making solid by welding has been carried out. In addition, the mechanical resistance of the welded joint is such that it does not run the risk of being destroyed under the effect of the pre-stress.

Thus, it becomes possible to make the two races solid in respect of one another in the required conditions before their assembly on the shaft and, only once the races are made solid, the one-piece component is mounted on the shaft. This results in a great simplification of the assembly (one single instrument to be mounted instead of two), and in particular all the exterior means which were destined to the maintenance of the pre-stress (nut-threading, glue, etc.) are no longer needed. The shaft no longer has to be manufactured in a specific way, the weight of the rotating unit is minimum and its inertia is reduced.

In other words, owing to the means provided by the invention, the manufacture and assembly of the unit are simplified and the operating properties of this unit are improved at the same time.

Figure 2:
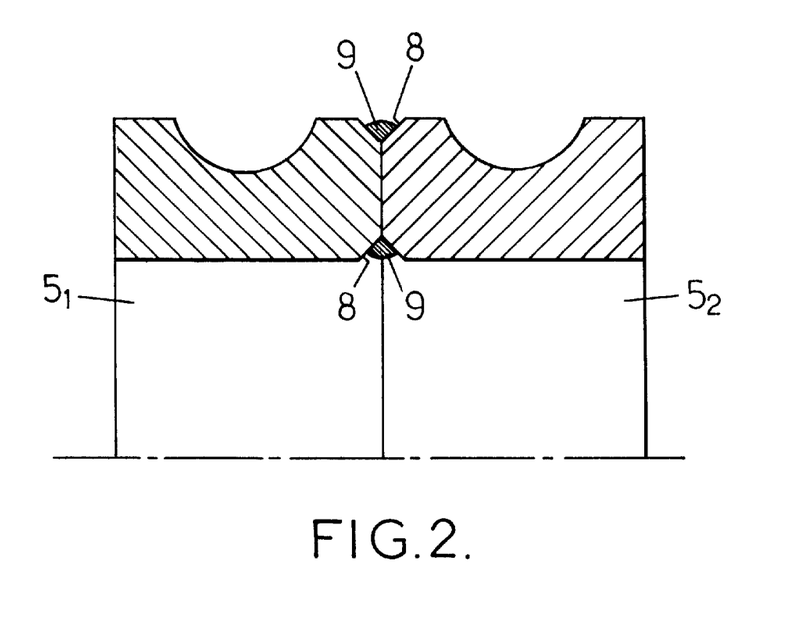
FIG. 2 is a partial schematic view in section, on a larger scale, of a one-piece component formed from two races welded to each other according to the invention in order to equip the bearing of FIG. 1.

In practical terms, as is visible in FIG. 1, but is even more visible in FIG. 2, at least one of the edges, exterior and/or interior, of the co-operating faces of the two races $5_1$ et $5_2$ is beveled. These beveled edges together form, once the two races are placed side by side, an annular groove 8. With the beveled edges being, in the simplest way, a simple annular dish, the groove 8 thus constituted presents a transversal section in a V. The welded joint 9 is thus deposited in said groove 8 in such a way that no part of the welded joint projects out of the groove 8. The groove 8 must therefore have geometry (deepness, opening) which is able to deal with a welding course suitable for assuring the required mechanical assembly, without exterior projection, in order to avoid hampering the subsequent assembly of the double race.

It is understood that the realization of the welding is easier when it is the exterior edges of the co-operating faces of the races which are beveled and when the groove 8 opens onto the exterior.

However, both for reinforcing the mechanical assembly of the two races by not leaving this function to one single welding course and for avoiding certain difficulties which arise during pre-stressing of the races for an exclusively exterior welded joint (risk of tipping-over of the two races under the effect of the effort of pre-stressing), it proves advantageous for welding to be also carried out along the interior edges of the co-operating faces of the races and thus for these interior edges themselves also to be beveled. Under these circumstances, in order to avoid said risk of tipping-over during pre-stressing, the interior welding should be carried out first and then, only after this, should the exterior welding be carried out.

FIGS. 1 and 2 show the two interior races $5_1$ et $5_2$ made solid by two welded joints 9, interior and exterior.

The welding is advantageously carried out by laser, according to the techniques known by experts. The welding course can be realized in a continuous way, in particular for the exterior welded joint, for example when one can make the unit of the two pre-stressed races turn continuously in front of the laser beam.

Figure 4:
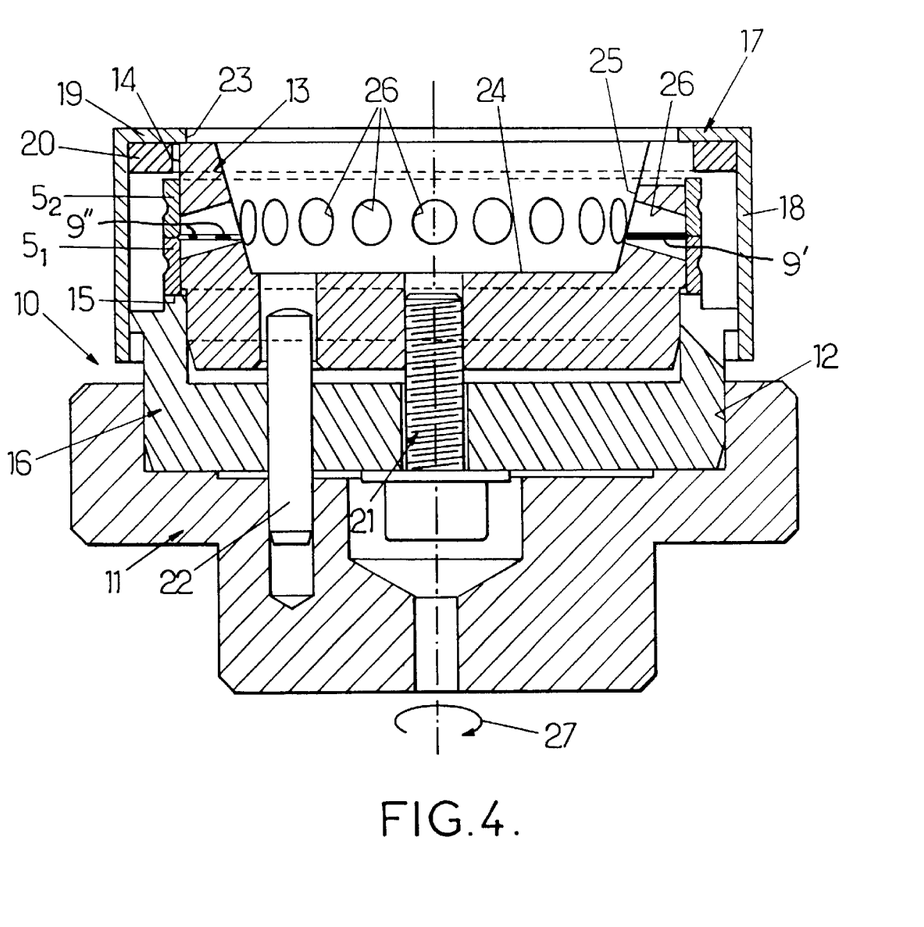
FIGS. 4 and 5 are views in section of a tool constructed according to the invention for the realization of double races, respectively interior and exterior.

However, it is not excluded that the welding is carried out by successive sections, in order to form either a continuous welding course by joined-up sections as shown by joints 9' shown on the right hand side of FIG. 4 or a discontinuous welding course as shown by joints 9" shown on the left hand side of FIG. 4. Such a process of welding by successive sections is in particular implemented for the interior welding by reason of the difficulty of access to the interior groove 8, and a specific tool will be presented below in order to facilitate this work.

The preceding explanations have been given more specifically with regard to the mode of realization illustrated in FIGS. 1 and 2, in which the two races $5_1$ and $5_2$ are interior races, that is to say those which are solid in respect of the rotating shaft 1.

Figure 3:
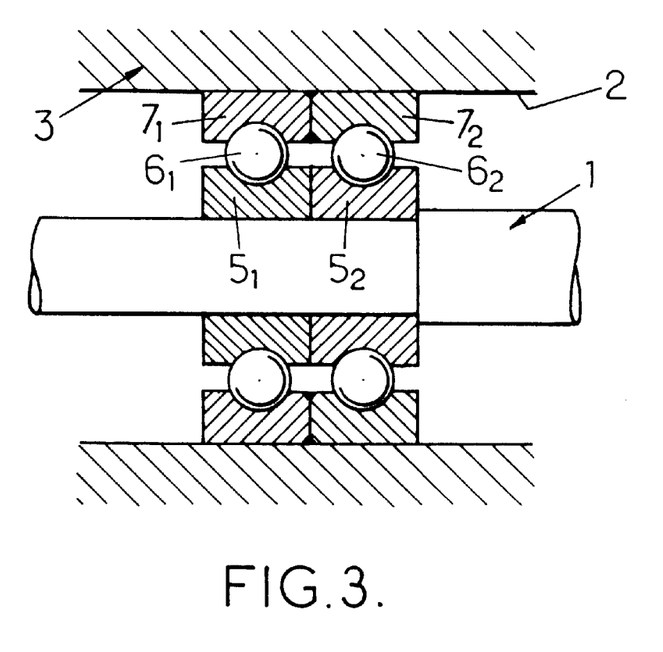
FIG. 3 is a partial schematic view in section of an alternative embodiment of the assembly of FIG. 1.

However, it is clear that the provisions of the invention also apply in the same way and with the same advantages to exterior races, that is to say the races $7_1$ and $7_2$ which are solid in respect of the bore 2 of the support body 3, as is illustrated in FIG. 3, wherein the same numeric references are retained for the components identical to those of FIGS. 1 and 2.

Thus, for the assembly of a bearing with double ball bearings for the rotary support of a rotating shaft of a very high precision device, wherein this bearing with double ball bearings is constituted by the juxtaposition of two bearings with single ball bearings having two of their respective races, interior or exterior, tightened axially against one another, according to the invention the following process is followed:

one pairs two bearings with single ball bearings; in particular thus, their respective races, interior $5_1$ and $5_2$ or exterior $7_1$ and $7_2$, have co-operating faces having complementary geometric properties;

after disassembly of the two bearings, one positions said two respective races, $5_1$, $5_2$ or $7_1$, $7_2$ against one another and one tightens them axially against one another with a pre-determined pre-stress;

one then carries out welding along at least one of the edges, interior or exterior, of the cooperating faces of the two respective races maintained under said pre-stress, in such a way that the welded joint does not radially project beyond the peripheral annular faces of said races, wherein said welded joint is carried out only along exterior edges or else along interior edges first of all, then outside of their cooperating faces, preferably by implementation of a laser beam;

then one mounts the one-piece component formed from the two races welded to one another, under pre-stress, in position on its support part and one finishes the complete assembly of the bearing by eccentration according to the principle of deep-groove ball bearings.

Figure 5:
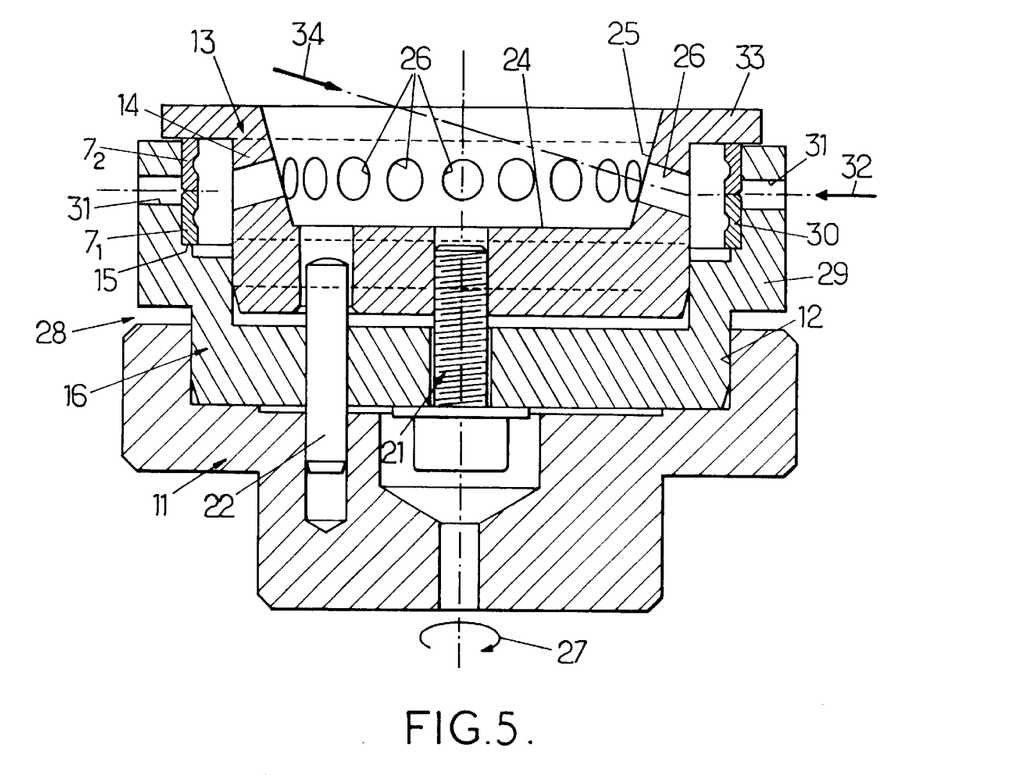

For the implementation of the welding process of the two races maintained under pre-stress, according to the invention a specific tool is proposed, of which two modes of realization are shown in section in FIGS. 4 and 5 respectively. This tool achieves the support, the coaxial centering and the pre-stressing of two races of ball bearings in order to be able to weld them to one another, while they are maintained under pre-stress, along the interior and/or exterior edges of their co-operating faces.

In FIG. 4, the tool designated in its entirety by the reference 10 is designed for welding two interior races $5_1$, $5_2$ maintained under pre-stress. The tool 1 comprises a plate 11 having, above, a bowl 12 suitable for retaining coaxially a chuck 13 which is essentially tubular and has a lateral wall 14 with a cylindrical external face of revolution which is able to support and to center coaxially two races $5_1$ and $5_2$ positioned one after the other. Additionally provided are first means of axial abutment 15, solid in respect of said chuck, against which a free side of one of the races $5_1$ comes in support.

As shown in FIG. 4, the first means of abutment 15 can be carried by a hub 16, which rests in said bowl 12 of the plate 11 and which is designed in a bowl in which said chuck 13 is fitted in. It is thus the upper annular edge of the lateral wall of said hub 16, which has an external diameter which is appreciably greater than the external diameter of said chuck, which constitutes said first means of abutment 15.

On the upper edge of the chuck 13, a component in the form of a cover 17 is made solid, of which the lateral skirt 18 surrounds, at a radial distance, the two races $5_1$, $5_2$ and is maintained coaxially by an excrescence of the hub 16. The plateau 19 of the cover 17, or else as shown here a ring solid in the interior of the said plateau 19, constitutes second means of abutment suitable for bringing to bear against the free face of the other race $5_2$ when the chuck 13 is axially brought closer to the hub 16.

In order to ensure this bringing-closer, a tightening instrument such as a bolt 21 positioned coaxially to its head which takes support against the lower face of the hub 16 and its stem, which crosses the bottom of said hub, is screwed into the bottom of the chuck 13. The tightening of the bolt 21 enables the two races $5_1$, $5_2$ to be subjected to a predeterminable pre-stress.

In addition, one or several pieces 22 are engaged in aligned bores of the support surface 11, of the hub 16 and of the chuck 13 in order to make them solid in rotation.

In order that the races $5_1$, $5_2$ can be welded to one another along the interior edges of their co-operating faces by means of a laser beam, the chuck 13 and the cover 17 are constructed as follows.

The cover 17 is open in 23 in its central region.

The chuck 13 is hollowed out centrally in a bowl in 24 and its lateral wall 25 is pierced with a multiplicity of traversing holes 26 distributed peripherally in a regular way and emerging in regard to the joined-up faces of the two races $5_1$, $5_2$. These holes 26 are inclined towards the bottom radially from the interior towards the exterior.

Thus a laser beam can be guided through the opening 23 of the cover and successively through all the holes 26 in the axis thereof, in order to achieve discontinuous welding courses on the interior edges of the co-operating faces of the races $5_1$, $5_2$ while these races are maintained under predetermined axial pre-stress by tightening of the hub and of the chuck.

In order to facilitate the work which has just been described, with the laser source being positioned in a fixed way, the chuck 13 is turned around its axis so that all the holes 26 are successively presented to the laser beam. For this purpose, the plate 11 is constructed to be supported in a rotary way (means not shown, schematized by the arrow 27).

As for the realization of the welding of the exterior edges of the co-operating faces of the races $5_1$, $5_2$, this can be realized using the tool 10 in providing holes (not shown) in the skirt 18 in order to obtain discontinuous access to the laser beam. However, this welding can also be realized, after extraction of the one-piece component formed by the two races $5_1$, $5_2$ welded in the interior, by positioning this one-piece component on another support, in such a way that the exterior welding can be carried out either in a discontinuous way or in a continuous way on the whole periphery.

In FIG. 5, a further mode of realization of the tool is illustrated, wherein the tool is designated in its entirety by the reference 28 and is constructed for the welding of two exterior races $7_1$ and $7_2$. The general design of the tool 28 remains identical as a whole to that of the tool 10 of FIG. 4, with the exception that it is adapted so that the exterior races $7_1$, $7_2$ are supported and centered coaxially by their internal faces.

For this purpose, the hub 16 presents a lateral wall 29 extended towards the top, above and radially shifted towards the exterior in relation to said retaining wall 15 of support. It is against the face 30, turned towards the interior, of this wall 29 that the races $7_1$, $7_2$ are in support, being distanced radially from the lateral wall 14 of the chuck 13.

The lateral wall 29 of the hub 16 is pierced by a multiplicity of holes 31 distributed over the perimeter of said wall 29. These holes 31, approximately radial, emerge approximately in regard to the exterior edges of the co-operating faces of the two exterior races $7_1$, $7_2$ thus becomes possible to carry out the exterior (discontinuous) welding of the races $7_1$, $7_2$ by guiding a laser beam (arrow 32) successively through the holes 31.

As for the lateral wall 14 of the hub 16, it is extended radially towards the exterior, along its upper edge, by an annular radial flank 33, which extends at least to just above the site of the races $7_1$, $7_2$. Thus, in rotating the bolt 21, one brings the chuck 13 closer to the hub 16 and the two races $7_1$, $7_2$ are brought tightly together and pre-stressed between the annular flank 33 and the retaining wall 15.

The lateral wall 14 of the chuck 13 retains said holes 26, through which a laser beam can be guided (arrow 34) in order to reach and weld (in a discontinuous way) the internal edges of the co-operating faces of the two races $7_1$, $7_2$.

What is claimed is:

1. A process of assembly of a composite bearing from two single bearings for rotary support of a rotating shaft of a very high precision device, wherein this composite bearing is constituted by (a) a juxtaposition of the two single bearings, each single bearing with single ball bearings and respective single interior and single exterior races and (b) a corresponding single interior or single exterior race of each single bearing being tightened axially against one another in order to form the composite bearing, said process of assembly of the composite bearing comprising a succession of the following steps:

pairing up two respective single bearings each with single ball bearings and single interior and single exterior races, wherein corresponding single races of the respective single bearings have co-operating faces having complementary geometric properties and terminating at edges, after disassembly of the two paired single bearings, supporting and centering the corresponding single races in a support having an interior component interior of the corresponding single races, the interior component including a series of peripheral holes which open adjacent a line formed by the interior edges of the co-operating faces of the corresponding single races and positioning the two corresponding single races against one another and forcing the two corresponding single races axially against one another with a predetermined pre-stress, welding the two corresponding single races which are under the pre-stress by guiding the laser beam onto discontinuous sections of the interior edges of the co-operating faces of the corresponding single races successively through the peripheral holes provided in the interior compartment, in such a way that the welded joint does not radially project beyond peripheral annular faces of the corresponding single races and a one-piece race component is formed, mounting the one-piece race component formed under the pre-stress in position on a support part, and finishing a complete assembly of the two paired bearings by an eccentration for deep-groove ball bearings.

2. The process according to claim 1, wherein said welding is realized at the sections continuously successively such that the laser beam is guided through adjacent holes.

3. The process according to claim 1, wherein said welding is realized at the sections discontinuously successively such that the laser beam is guided through non-adjacent holes.

4. The process according to claim 1, wherein the edges of the co-operating faces of the respective corresponding single races are beveled, and wherein the welding is effected in a bottom of a groove formed by two adjacent co-operating beveled edges.

5. The process according to claim 1, wherein the two corresponding single races are welded along interior and exterior co-operating edges thereof, and wherein the welding of the interior co-operating edges is carried out firstly and the welding of the exterior co-operating edges is carried out secondly.

* * * * *